United States Patent [19]

Tatar

[11] Patent Number: 4,571,152
[45] Date of Patent: Feb. 18, 1986

[54] VERTICAL AXIS WINDMILL

[76] Inventor: Frank J. Tatar, 6808 Lake Shore Rd., Derby, N.Y. 14047

[21] Appl. No.: 546,903

[22] Filed: Oct. 31, 1983

[51] Int. Cl.⁴ .............................................. F03D 7/06
[52] U.S. Cl. .................................... 415/4; 416/197 A
[58] Field of Search .............................. 415/2 R–4 R; 416/197 A

[56] References Cited

U.S. PATENT DOCUMENTS

| | | | |
|---|---|---|---|
| 74,687 | 2/1868 | Hidden | 415/2 R |
| 419,345 | 1/1890 | Otto | 415/3 R |
| 588,572 | 8/1897 | Hardaway | 415/4 R |
| 721,227 | 2/1903 | Pearson | 416/197 A X |
| 1,143,803 | 6/1915 | Benbow | 415/4 R |
| 1,225,033 | 5/1917 | Jackson | 415/2 R X |
| 1,449,192 | 3/1923 | Richard | 416/85 |
| 1,469,064 | 9/1923 | Zucker | 416/41 R X |
| 1,490,844 | 4/1924 | Mukai | 416/197 A X |
| 1,935,097 | 11/1933 | Nelson | 415/3 R |
| 2,169,149 | 8/1939 | Johanson | 415/2 R |
| 2,379,324 | 6/1945 | Topalov | 170/23 |
| 4,031,405 | 6/1977 | Asperger | 290/55 |
| 4,260,325 | 4/1981 | Cymara | 416/197 A X |
| 4,289,444 | 9/1981 | Monk et al. | 415/3 |
| 4,321,005 | 3/1982 | Black | 415/4 |
| 4,350,900 | 9/1982 | Baughman | 415/4 R X |

FOREIGN PATENT DOCUMENTS

| | | | |
|---|---|---|---|
| 145115 | 12/1949 | Australia | 415/4 R |
| 84158 | 12/1895 | Fed. Rep. of Germany | 416/197 A |
| 595500 | 10/1925 | France | 416/197 A |
| 2288879 | 5/1976 | France | 415/3 R |
| 111334 | 1/1945 | Sweden | 416/197 A |
| 83570 | 5/1920 | Switzerland | 416/197 A |
| 15646 | of 1892 | United Kingdom | 416/197 A |
| 13417 | of 1912 | United Kingdom | 415/3 R |
| 229470 | 2/1925 | United Kingdom | 415/2 R |

OTHER PUBLICATIONS

Page 3 of "The History of Windpower Windfarm Museum Martha's Vineyard".

Primary Examiner—Everette A. Powell, Jr.
Attorney, Agent, or Firm—Bean, Kauffman & Bean

[57] ABSTRACT

A vertical axis windmill features a wind vane assembly freely rotatable relative to an output shaft and having a first wind deflecting device for channeling oncoming wind relatively away from and towards wind reaction panel carrying spars, during those portions of rotational movement thereof relatively towards and away from the wind, respectively, a second wind deflecting device for channeling oncoming wind relatively towards such spars, during that portion of rotational movement thereof relatively away from the wind, and a wind vane cooperating with the first and second wind deflecting devices for maintaining same in desired relatively stationary positions relative to the direction of the oncoming wind, wherein the first wind deflecting device is formed with an opening fitted with an auxiliary panel directly responsive to high wind loading conditions to permit flow of oncoming wind through such opening for purposes of providing a motion retarding or braking effect on the rotational speed of the windmill throughout a substantial portion of the rotational movement of the spars towards the wind.

3 Claims, 4 Drawing Figures

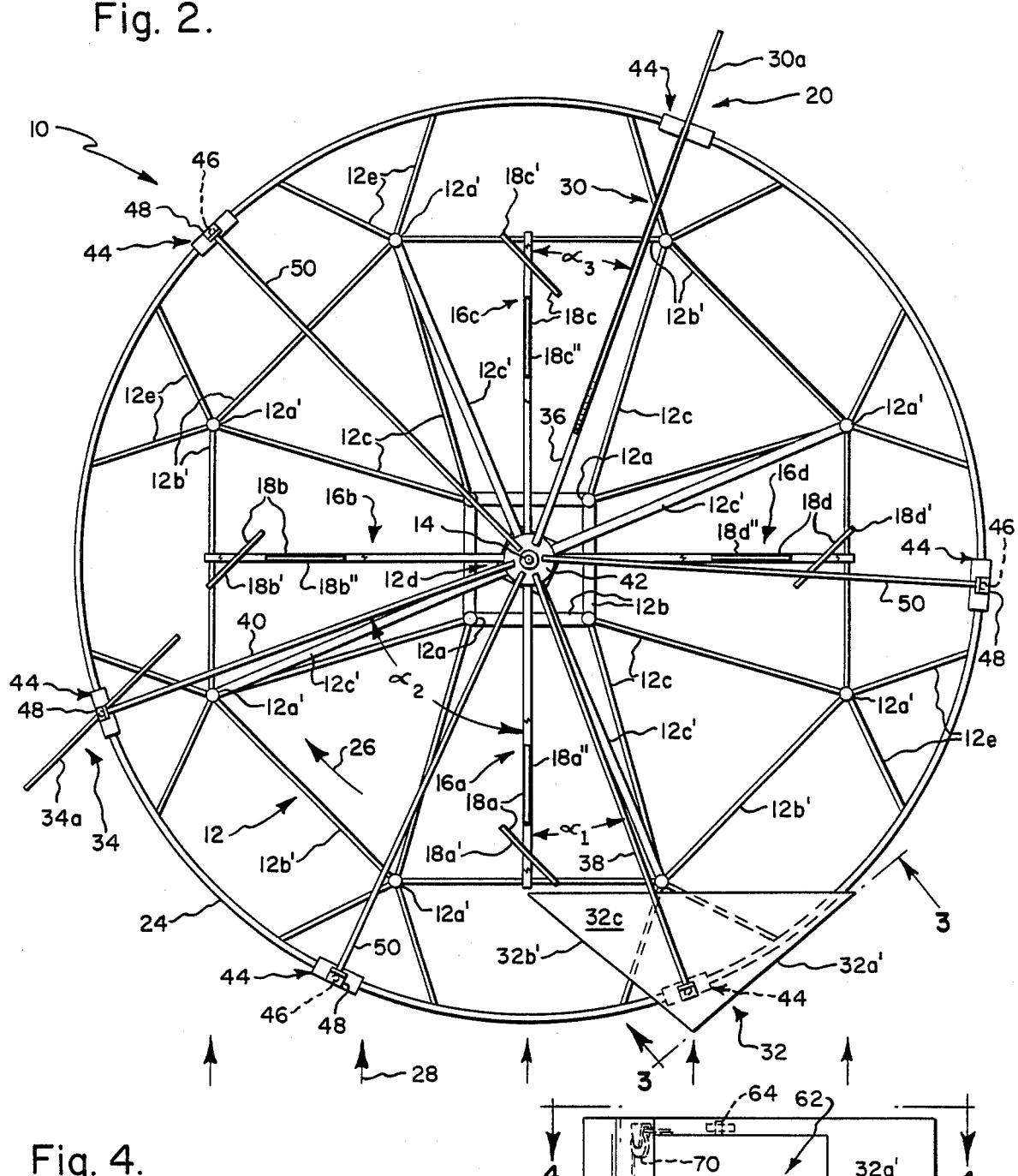
Fig. 2.
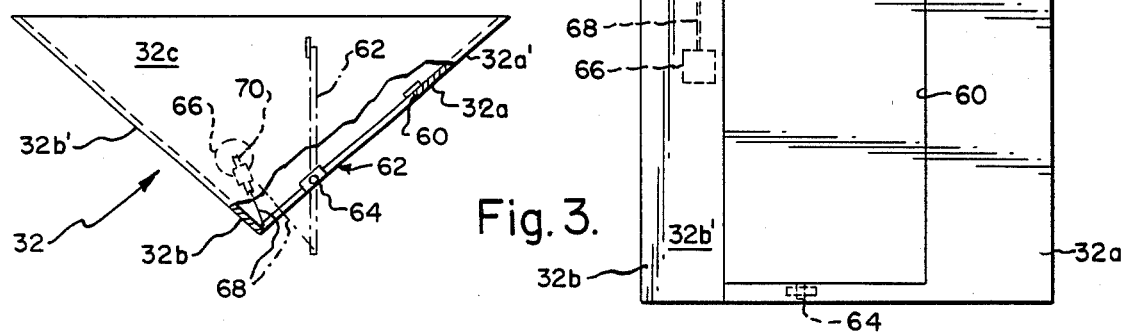
Fig. 4.
Fig. 3.

VERTICAL AXIS WINDMILL

BACKGROUND OF THE INVENTION

The present invention relates to improvements in windmills of the type having vertically extending wind reaction panels supported by spars extending radially of a vertically disposed, rotatable output or drive shaft, and more particularly towards improvements in vertical axis windmills of the type fitted with a plurality of wind reaction panels non-movably fixed to their associated spars.

In copending U.S. patent application Ser. No. 450,795, filed Dec. 17, 1982, and now abandoned, there is disclosed a vertical axis windmill having a wind vane assembly including a wind vane primarily intended for use in positionally locating a cam plate serving to effect rotational movements of wind reaction panels relative to their associated supporting spars, during that portion of the rotational movement of the spars in a direction relatively towards the oncoming wind. An additional feature of such wind vane assembly is the provision of a shield plate positioned to block or redirect the oncoming wind, so as to minimize drag on the spars and panels during rotational movement of the spars relatively towards the wind. The wind shield is preferably formed with a plurality of vertically extending, fixed position louvers, which serve to direct wind passing through slot openings formed in the shield plate for travel in a direction extending generally tangentially of the path of travel of the outer ends of the spars in a direction of rotation thereof, as such ends pass through the eye of the oncoming wind. Further, a wind speed sensing device carried by the wind vane may be employed to produce control signals characteristic of various wind loading conditions, which in turn control operation of a power generator unit of the windmill for purposes of preventing excessive rotational speed of the spars.

SUMMARY OF THE INVENTION

The present invention is directed towards a vertical axis windmill having a novel wind vane assembly including a wind vane serving to control positioning of a pair of wind deflecting or flow control devices relative to oncoming wind, whereby to provide for maximum power output of the windmill for any given wind condition.

More particularly, the present invention is directed towards a vertical axis windmill, wherein novel wind vane assembly is employed in combination with vertically disposed wind reaction panels, which are non-movably fixed to their associated spars and arranged to assume positions relative to one another to produce an air flow pattern enhancing the overall efficiency of the windmill.

DRAWINGS

The nature and mode of operation of the present invention will now be more clearly described in the following detailed description taken with the accompanying drawings wherein:

FIG. 2 is a top plan view of the windmill with portions thereof broken away for purposes of clarity;

FIG. 3 is an enlarged elevational view taken generally along the line 3—3 in FIG. 2; and FIG. 4 is a top plan view taken generally along the line 4—4 in FIG. 3.

DETAILED DESCRIPTION

Figure 1:
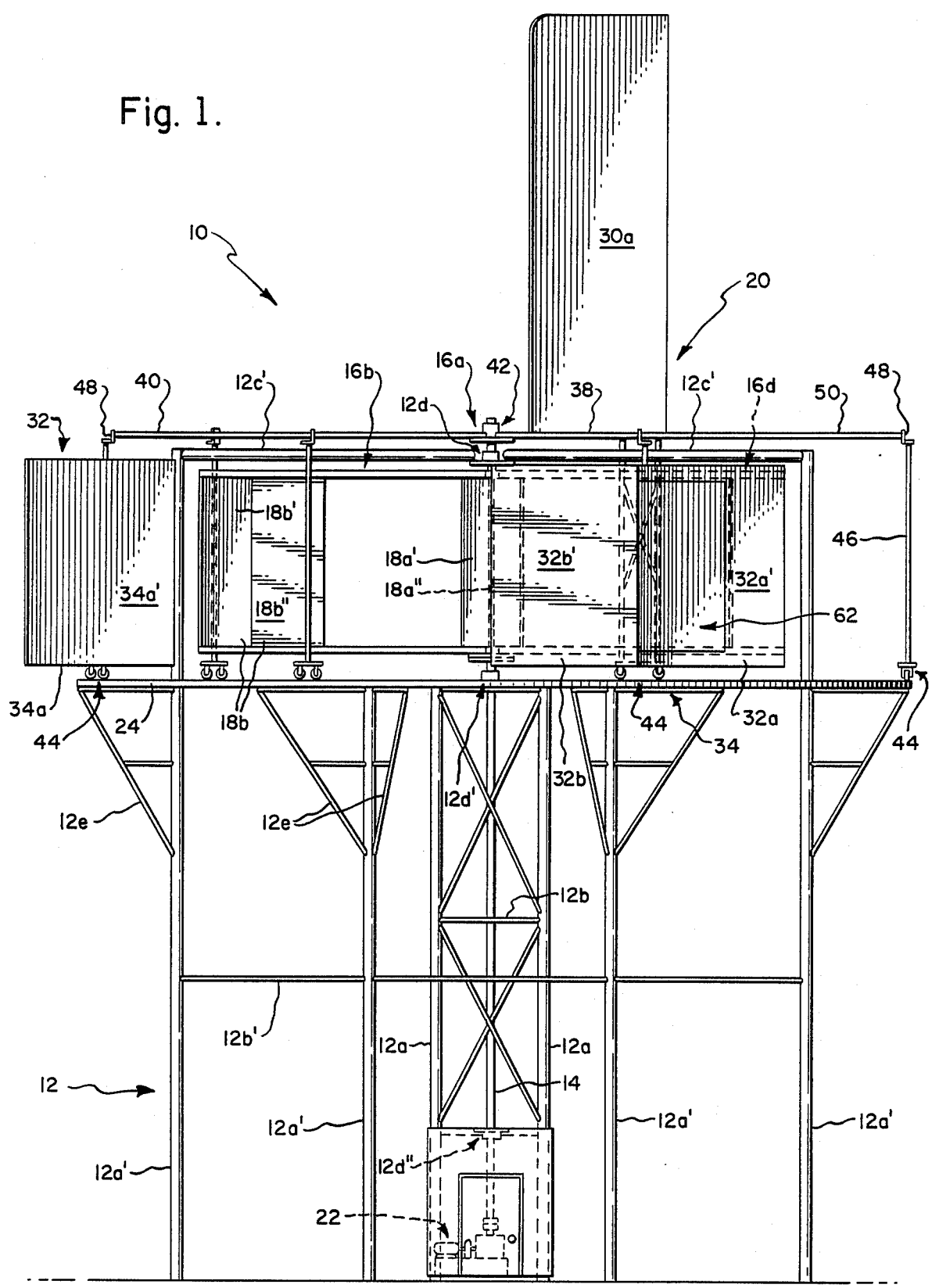
FIG. 1 is a side elevational view of a vertical axis windmill embodying the present invention.

Reference is first made to FIGS. 1 and 2, wherein a vertical axis windmill formed in accordance with a preferred form of the present invention is designated as 10, and shown as including a supporting tower 12; a vertically disposed output or driven shaft 14 arranged centrally of tower 12; four spars 16a–16d, which are rigidly fixed to output shaft 14 adjacent their inner ends to extend horizontally radially outwardly of the output shaft with a uniform angular spacing therebetween of essentially 90°; a plurality of vertically extending wind reaction panels 18a–18d, which are individually supported on spars 16a–16d, respectively; a wind vane assembly 20 supported for free rotational movement relative to both tower 12 and output shaft 14; and a conventional electrical power generator unit or other suitable power conversion means 22 drivingly coupled to the lower end of output shaft 14. If desired, windmill 10 may be provided with a main or primary weight balance means in the form of a main float assembly, not shown, associated with output shaft 14; and supplemental or auxiliary weight balancing means in the form of supplemental float assemblies, also not shown, associated with the outer ends of spars 16a–16d and/or wind vane assembly 20. A description of the construction of main and supplemental weight balancing means suitable for use with the present windmill may be had by reference to copending U.S. patent application Ser. No. 450,795.

Tower 12 may be of any desired construction depending on the size of and/or installation requirements for windmill 10. However, tower 12 is shown for purposes of illustration as including inner and outer groups of vertically upstanding support posts or columns 12a and 12a', wherein the posts of each group are interconnected by peripherally arranged brace members 12b and 12b' and the groups interconnected by brace members 12c. The upper ends of posts 12a' may be further interconnected by brace members 12c', which extend radially outwardly of a centrally disposed upper bearing block 12d. Intermediate and lower bearing blocks 12d' and 12d" disposed in vertical alignment with upper bearing block 12d are supported by posts 12a. Tower 12 may be further strengthened, if desired, by being interconnected with an annular guide trackway 24 via brace arms or members 12e fixed to extend outwardly of each of posts 12a'. As will be apparent, bearing blocks 12d, 12d' and 12d" cooperate to provide rotational bearing support for the upper, intermediate and lower portions of output shaft 14, with lower bearing block 12d''' and/or intermediate bearing block 12d' providing thrust bearing support for the output shaft, as required.

Spars 16a–16d are preferably of like construction and comprise parallel upper and lower spar elements, which are of like construction and cantilever supported by output shaft 14 to extend horizontally outwardly thereof with sufficient vertical spacing therebetween to accommodate for the vertical height of panels 18a–18d. Preferably, the spar elements are tapered in the intended direction of rotational movement of the spars about the axis of output shaft 14, which is designated by arrow 26 in FIG. 2, or otherwise provided with a desired cross-sectional configuration, which will minimize aerodynamic drag. Also shown in FIG. 2 are arrows 28 serving to designate the direction in which wind blows relative to windmill 10 at any given time.

If desired, direction control means, such as may be defined by a ratchet device, not shown, may be provided to prevent unintended rotation of spars 16a–16d in a direction opposite to that designated by arrow 26, which might otherwise initially occur under windmill startup conditions in the event that wind vane assembly 20 is not properly oriented with the initial direction in which wind starts to blow with sufficient force to operate the windmill. However, it is contemplated that, even if such unintended rotation is not constrained, same will only be momentary in nature and quickly corrected under normal operating conditions, due to the capability of wind vane assembly 20 to automatically orient itself relative to the wind in the manner to be described.

Panels 18a–18d may be of any desired construction, but for purposes of illustration are shown in the drawings as comprising vertically elongated, rectangular sheets or plates fabricated from a suitably rigid material, such as metal, which are rigidly fixed, as by welding, bolt mounting devices or clamps, to the upper and lower elements of their associated spars 16a–16d. The size and number of panels fixed to each spar will depend on windmill size and operating requirements. However, it is preferable to provide the spars with relatively outer panels 18a'–18d' and relatively inner panels 18a"–18d", wherein the panels on each spar are relatively closely grouped together and the innermost ones of such panels are relatively widely spaced or remote from output shaft 14, so as to provide a relatively substantial, cylindrically shaped, open area bounding the upper end portion of the output shaft through which wind may pass or flow without obstruction. Further, while an operative windmill may be constructed by arranging all of the panels on each spar to assume a common orientation, such as for instance one in which the panels on each spar lie within a common vertical plane extending lengthwise of such spar and radially of output shaft 14, it is preferable to arrange only the relatively inner panel or panels in such plane and to dispose the relatively outer panel at an angle relative thereto in the manner best shown in FIG. 2. More specifically, it has been found that a substantial increase in operating efficiency may be achieved within an intended operating range of windmill 10 by inclining the outermost panels 18a'–18d' relative to innermost panels 18a"–18d" at angles of preferably about 45°, such that the wind reaction surfaces of the former, that is, their surfaces arranged to trail relative to the direction of rotation of the spars, serve to direct air flow radially inwardly across the surfaces of their associated inner panels, which lead in the direction in which the spars rotate. The relative sizing of the inner and outer panels will depend upon installation operating requirements, but such panels are shown in the drawings for purposes of illustration as being of like size. If a greater wind reaction surface is deemed necessary, the number of inner panels provided on each spar may be increased or more simply a single inner panel of greater width or horizontal dimension would be employed.

Wind vane assembly 20 generally includes a wind vane 30 defined by a rigid, vertically extending panel 30a disposed to lie within a vertical plane extending radially outwardly of the rotational axis of output shaft 14; a first wind deflector or director 32, which is defined by a pair of rigid, vertically extending panels 32a and 32b joined to define a V-shaped unit; and a second wind deflector or director device 34, which is defined by a rigid, vertically extending panel 34a arranged in a convergent relationship to panel 32b in the direction in which the wind is blowing. Panels 30a, 32a, 32b and 34a are rigidly interconnected via radially extending struts 36, 38 and 40 to a centrally located sleeve bearing device 42 journal connected to and supported by the upper end of output shaft 14. It is contemplated that in a preferred form of the present windmill, substantially all of the weight of wind vane assembly 20 will be transmitted directly to tower 12 by fitting the wind vane and the wind deflector devices with roller support devices 44 arranged to roll along trackway 24. The rigidity of wind vane assembly 20 may be increased by providing additional trackway/roller device supported standards 46, which are arranged intermediate the wind vane and deflector devices and connected thereto by brace member 48 shown only in FIG. 1, and connected to bearing device 42 by radially extending struts 50.

In accordance with the present invention, wind vane assembly 20 has its elements sized and arranged such that deflector devices 32 and 34 tend to assume operative positions relative to the direction in which the wind is blowing and the overall assembly is balanced for all wind conditions under which windmill 10 is designed to operate. In this respect, it is contemplated that deflector device 32 be shaped and sized and have an operative position in which it is arranged to shield wind reaction panels 18a–18d from the oncoming wind, during the whole or at least a substantial part of their travel relatively towards the wind, with panel 32a serving to direct oncoming air for flow radially outwardly of the wind reaction panels and panel 32b serving to direct oncoming air for flow against the rear or wind reaction surfaces of such panels as their spars pass through the eye of the wind. On the other hand, deflector device 34 is intended to have an operative position in which its panel 34a serves to direct oncoming air for flow radially inwardly of spars 16a–16d, during a substantial portion of the rotational movement thereof away from the wind; the result being that deflector panels 32b and 34a cooperate to funnel the oncoming air and increase the loading applied to wind reaction panels 18a–18d over that which would otherwise be established by a non-deflected air stream passing between the deflector panels.

The relative size of and angular positioning or spacing between panels 30a, 32a, 32b, and 34a for any given windmill installation is chosen such that deflector devices 32 and 34 tend to remain stationary in their operative positions for any given direction in which the wind is blowing.

To facilitate better understanding of the present invention an actual, relatively small size windmill installation is shown in the drawings and now described in detail. In the illustrated construction, the overall span of windmill 10, as measured between the outer ends of spars 16a and 16c or between spars 16b and 16d is approximately 20 feet and the spar elements vertically spaced to receive wind reaction panels each having a height of approximately 6 feet and a width of approximately 4 feet. Outermost panels 18a'–18d' are arranged at angles of essentially 45° relative to their associated inner panels 18a"–18d" with the relatively inner and outer marginal edges of associated ones of the outer and inner panels being arranged to lie within a common plane extending normal to the respective inner panels.

First wind deflector device 32 is fabricated from like size panels 32a and 32b, which are joined together at adjacent vertically extending marginal edges thereof, such that their wind reaction surfaces 32a' and 32b' cooperate to form an obtuse angle of approximately 270°, wherein each such surface is intended to form an angle of approximately 45° relative to the direction of the wind. Panels 32a and 32b are each approximately 6½ feet wide and 8 feet high and arranged such that they extend vertically above and below panels 18a–18d. The apex of device 32 is arranged such that its projected base, as measured between the free vertically extending edges of panels 32a and 32b spans the length or horizontal dimension of spars 16a–16d, as best shown for the case of spar 16d in both FIGS. 1 and 2, in order to entirely shield the spars from the force or effects of the wind, during rotation thereof relatively towards such wind.

When first deflector device 32 is in its normal operative position shown in FIG. 2, strut 38 forms an angle $\alpha_1$ of approximately 23° relative to the direction of the wind.

Panel 34a is essentially equal in size to each of panels 32a and 32b and fixed to strut 40 such that its wind reaction surface 34a' forms an angle of approximately 45° relative to the direction of wind with strut 40 being arranged at an angle $\alpha_2$ of approximately 68° relative to the direction of the wind.

It has been found that when the panels of first and second wind deflector devices 32 and 34 are sized and arranged in the manner described above, such devices may be dynamically balanced or maintained essentially stationary in their desired operative positions under relatively stable wind conditions by arranging wind vane 30 and its supporting strut 36 to reside at an angle $\alpha_3$ of approximately 18° relative to the direction of the wind and by forming wind vane panel 30a about six times larger then panels 32a, 32b and 34a. Approximate values of $\alpha_1$, $\alpha_2$ and $\alpha_3$ were determined through a series of tests conducted on a reduced scale prototype of windmill 10, wherein test results were obtained for each angle varied in 10° increments under unidirectional fan created loading conditions. The test values obtained were sufficient to permit their use in the design of the actual windmill shown in the drawings.

Reference is now made to FIGS. 3 and 4, wherein panel 32a of first wind deflector device 32 is shown as being cut away to define an opening 60 in which is fitted an auxiliary panel 62 journaled for pivotal or swinging movement about a vertical axis by stub shaft bearing devices 64 between closed and open positions shown in full and broken line in FIG. 4, respectively. In the illustrated construction, panel 62 has height and width dimensions of approximately 7½ feet and 4 feet, respectively, and the pivot axis defined by bearing devices 64 is disposed approximately 1½ feet from the apex of device 32 and thus offset relative to the center of panel 62. While various means may be employed to control movement of panel 62 from and return to its normal closed position, a suitable arrangement includes a weight 66, which is attached via a cable 68 to the upper left hand corner of panel 62, as viewed in FIG. 3; cable 68 being passed over a pulley 70 mounted to depend from a bracing panel 32c fixed to the upper marginal edges of panels 32a and 32b. Weight 66 is chosen/adjusted in value to maintain auxiliary panel 62 in closed condition, wherein it lies flush with panel 32a for design wind loading conditions under which windmill 10 is intended to operate, while permitting such auxiliary panel to swing into a partial or fully opened position whenever design wind loading conditions are exceeded.

In operation, as wind speed approaches a minimum design operating speed, the force of the wind will act on panels 18a–18d to initiate rotation of spars 16a–16d, while simultaneously acting on wind vane 30 and wind deflector devices 32 and 34 in a manner tending to position these elements of the wind vane assembly 20 in their operative positions shown in FIG. 2 by the time such minimum design operating speed is achieved. A change in wind direction will simply serve to rotate assembly 20 relative to tower 12 until it is again arranged in the position shown in FIG. 2 relative to the new direction in which the wind is blowing. However, to simplify the following description, it will be assumed that a steady state wind direction exists, such as that normally prevailing at the site of installation, during a given period of windmill operation. It will also be assumed that at a given instance, spars 16a–16d are disposed in given initial position relative to the wind, such as those shown in FIG. 2, wherein spar 16a is aligned with and faces in the direction from which the wind is blowing; spar 16b is displaced through 90° of rotation in a direction relatively away from the wind; spar 16c is aligned with and faces in the direction in which the wind is blowing; and spar 16d is displaced through 90° of rotation in a direction relatively towards the wind. Then, for the case of a small windmill constructed in the manner described above, first deflector device 32 serves to mask or shield essentially the whole of spar 16d, with panel 32a serving to deflect oncoming air impinging thereon for flow radially outwardly of the path of spar 16d throughout the range of its rotational movement relatively towards the wind and panel 32b serving to deflect oncoming air impinging thereon for flow essentially tangentially of the midpoint of the path of travel of the outer end of each spar as same travels between the illustrated positions occupied by spars 16a and 16b. Also for this construction, second deflector device 34 serves to deflect oncoming air impinging thereon for flow radially inwardly towards spar 16b; such deflected air flow cooperating with the deflected air flow established by panel 32b to increase the loading applied to spar 16b over that which would otherwise be established by the non-deflected oncoming air stream passing between the first and second deflector devices. Then, as rotation of the spars continues, spar 16a moves out of the shadow of first deflector device 32 in a direction towards the position initially occupied by spar 16b, as the latter in turn moves towards the position initially occupied by spar 16c; spars 16c and 16d passing into or remaining within the shadow of first deflector device 32. As spar 16a rotates through its first 90° increment of rotational movement relatively away from the wind, it is exposed to a progressively increasing portion of the non-deflected air passing between the deflector devices, and as it rotates beyond about its first 45° increment of rotational movement, the deflected air flow established by second deflector 34 passes radially inwardly of the leading surfaces of its panels in a manner tending to reduce air pressure acting to oppose movement of such spar. As spar 16b moves away from its initial position, it is exposed to a progressively decreasing portion of the non-deflected air stream passing between the deflector devices, but the loading thereby applied to its panels is increased by exposure to the deflected air stream created by second deflector device 34. In this manner, each spar is exposed to a substantially higher wind loading, during rotation thereof through 180° away from the wind, than would otherwise be obtainable from a non-deflected air stream of the same speed. As a result, for any given wind speed within the design operating range of windmill 10, the efficiency of the operation is greater than would be the case, if second deflector device 34 were to be omitted and/or first deflector device 32 shaped to simply shield the spars from the motion damping or braking effects of the oncoming air or divert the whole of that portion thereof engaging its wind reaction surfaces for flow radially outwardly of the spars, during rotation thereof towards the wind. The efficiency of operation of windmill 10 has been found to be further increased by canting the outmost panels 18a'–18d' in the manner previously described.

Operation of windmill 10 in the manner described for purposes of driving generator 22 via output shaft 14 will continue so long as the speed of the oncoming wind is at or above minimum design levels; wind vane assembly 20 automatically turning or rotating relative to tower 12 incident to shifts in the direction in which the wind is blowing. Upon the occurrence of high wind gusts or of a constant wind speed exceeding maximum design levels, weight 66 permits partial or full opening of auxiliary panel 62 to allow flow of air through panel opening 60 for rotation retarding or braking contact with the spars 16a–16d, as same rotate in a direction towards the wind. As a result, windmill 10 may continue to operate without exceeding a desired spar rotational speed under wind loading conditions, which would otherwise require application of a suitable brake to retard rotation of the output shaft.

A windmill substantially larger than that presently illustrated and described, such as would have an overall span of a hundred feet or more, may be identical in operation, assuming a proportionate scalingup of parts of such windmill. Alternatively, if a direct scaling-up of parts is not desired in view for instance of fabrication or shipping considerations, various changes in the illustrated construction are contemplated, which will entail some slight variation in details of windmill operation. As by way of example, it is contemplated that as the overall span of a proposed windmill increases, it will not be necessary or desirable for first deflector device 32 to have a horizontal dimension corresponding to the individual lengths of spars 16a–16d and be placed such that it shields the whole of such spars throughout the range of rotational movement thereof relatively towards the wind. Specifically, it is contemplated that first deflector device need be arranged and horizontally sized to shield only the relatively outer end of the spars on which panels 18a–18d are mounted, such that the panels are shielded from the oncoming wind through only a portion of their movement relatively towards the wind, such as for instance, within 30° to 45° on either side of the position of panels 18d illustrated in FIG. 2. For this arrangement, panel 32a would still tend to direct oncoming air for flow outwardly of panels 18a–18d, as they move towards the wind, but panel 32b, due to its outwardly displaced position, would direct such oncoming air for driving engagement with the wind reaction surfaces of the panels prior to the arrival of their associated spars at the position of spar 16a illustrated in FIG. 2. Further, as the size relationship between parts of any given windmill varies from that illustrated in the drawings, it may become necessary or desirable to provide for variations in the values of angles $\alpha_1$, $\alpha_2$ and $\alpha_3$ and in the relative sizing and orientation of panels 30a, 32a, 32b and 34a, as required to provide for dynamic stability and proper functioning of wind vane assembly 20.

What is claimed is:

1. A vertical axis windmill comprising in combination:
   a tower;
   an output shaft supported by said tower for rotation about a vertically disposed axis;
   a power conversion means coupled to said output shaft;
   a plurality of horizontally disposed spars fixed for rotation with said output shaft and arranged to extend radially thereof;
   a plurality of vertically disposed wind reaction panels carried at least one on each of said spars;
   a wind vane assembly freely rotatable relative to said drive shaft and said tower, said assembly including a first wind deflecting device comprised of a pair of vertically extending panels joined to define a V-shaped unit having its apex arranged to face towards the wind, wherein a first panel is arranged to direct oncoming air radially outwardly of said spars away from said wind reaction panels, during those portions of the rotational movement of said spars relatively towards the wind, a second wind deflecting device cooperating with said second panel for channeling oncoming air towards said wind reaction panels, during that portion of the rotational movement of said spars relatively away from the wind, and a wind vane cooperating with said first and second wind deflecting devices for maintaining same in desired, relatively stationary operative positions relative to the direction of the oncoming wind, and said first panel is provided with a through opening extending from adjacent the juncture of said first and second panels, an auxiliary panel supported for movement between opening closed and open conditions, and means for normally maintaining said auxiliary panel in an opening closed condition, while permitting movement thereof into open condition in response to predetermined high wind loading condition thereon to allow oncoming air to flow through said first panel into motion retarding engagement with said wind reaction panels during rotational movement of said spars relatively towards the wind.

2. A windmill according to claim 1, wherein at least two of said wind reaction panels are mounted on each of said spars and include a radially outer panel and a radially inner panel, said inner panel lies within a vertical plane extending lengthwise of said spar on which same is mounted, said outer panel is disposed at an angle of approximately 45° relative to said plane for directing air flow radially inwardly across a surface of an adjacent inner panel leading in the direction of rotation of said output shaft, and said wind reaction panels on each said spar are grouped together adjacent a radially outer end thereof such that the inner panel is relatively widely spaced from said output shaft so as to provide a relatively substantial, cylindrically shaped, open area bounding said output shaft through which wind is free to flow without obstruction.

3. A windmill according to claim 2, wherein said said second deflecting device is a panel arranged at an angle of essentially 45° relative to the direction of the wind when in the operative position thereof, said first and second panels of said first deflecting device are arranged at essentially equal angles relative to the direction of the wind when in the operative position thereof and said first and second panels form an angle of essentially 270° as measured between surfaces thereof arranged to face the wind.

* * * * *